(12) United States Patent
Maschera et al.

(10) Patent No.: US 8,563,892 B2
(45) Date of Patent: Oct. 22, 2013

(54) METHOD AND APPARATUS FOR LASER ENGRAVING

(75) Inventors: Flavio Maschera, Gorgonzola (IT); Pedro Barrote, Porto (PT)

(73) Assignee: Standex International Corporation, Salem, NH (US)

( * ) Notice: Subject to any disclaimer, the term of this patent is extended or adjusted under 35 U.S.C. 154(b) by 699 days.

(21) Appl. No.: 12/586,473

(22) Filed: Sep. 22, 2009

(65) Prior Publication Data

US 2010/0072181 A1 Mar. 25, 2010

Related U.S. Application Data

(60) Provisional application No. 61/194,024, filed on Sep. 24, 2008.

(51) Int. Cl.
*B23K 26/00* (2006.01)
(52) U.S. Cl.
USPC .............. 219/121.61; 219/121.6; 219/121.62

(58) Field of Classification Search
None
See application file for complete search history.

(56) References Cited

U.S. PATENT DOCUMENTS

| | | | | |
|---|---|---|---|---|
| 5,822,209 | A * | 10/1998 | Fischer | 700/160 |
| 7,800,638 | B2 * | 9/2010 | Ogawa | 347/224 |
| 2003/0171730 | A1 * | 9/2003 | Kelly et al. | 604/383 |
| 2003/0214083 | A1 * | 11/2003 | Kelly et al. | 264/571 |
| 2004/0116029 | A1 * | 6/2004 | Kelly et al. | 442/394 |
| 2004/0164062 | A1 * | 8/2004 | Horisberger | 219/121.82 |
| 2005/0013328 | A1 * | 1/2005 | Jurgensen | 372/6 |
| 2006/0272529 | A1 * | 12/2006 | Van Denend | 101/401.1 |
| 2007/0095231 | A1 * | 5/2007 | Van Denend | 101/375 |
| 2009/0212029 | A1 * | 8/2009 | Ellis et al. | 219/121.68 |

* cited by examiner

*Primary Examiner* — Jarrett Stark
(74) *Attorney, Agent, or Firm* — William B. Ritchie

(57) ABSTRACT

A method and apparatus for laser engraving a three-dimensional pattern on a surface. A moveable laser head having a plurality of laser beams is provided. Preferably, the number of laser beams is four. Each beam is capable of being individually adjustably controllable.

9 Claims, 3 Drawing Sheets

METHOD AND APPARATUS FOR LASER ENGRAVING

This application claims benefit under Title 35 USC, §119 (e) of U.S. Provisional Application Ser. No. 61/194,024 filed Sep. 24, 2008.

FIELD OF THE INVENTION

The invention relates to a method and an apparatus for engraving a three dimensional pattern onto a surface using a laser, in particular, a method utilizing a plurality of laser beams provided by a single laser head wherein each beam correspondingly controls the removal of a predetermined variable laminated volume of material such that an accurate pattern is engraved onto the surface.

BACKGROUND AND SUMMARY OF THE INVENTION

It is well known in the art to use a laser beam to etch a pattern onto a surface wherein the etched or engraved surface is then suitable for transferring this engraved pattern onto a material (usually thermoplastic) such that the surface of the product produced accurately represents a desired appearance and texture such as simulating wood grain, geometrical grain or leather. The depth of the cut is controlled by varying the intensity of the laser beam as the beam traverses the surface that is to be etched. Use of this technique enables man-made materials in situations requiring durable, cost effective materials to be used yet have the appearance of natural (or geometrical) obtained counterparts. In fact, vinyl siding, for example, can be manufactured that features a "leather" appearance and feel, yet has the advantages of superior durability.

Prior art techniques initially scanned the surface that was intended to be copied, such as leather or wood grain, to determine the position location and depth information which is then stored in a computer. The stored data is then processed to operate a laser beam that is directed onto the surface that is to be engraved. Representative of this technology is the method disclosed in U.S. Pat. No. 5,886,317, issued to Hinrichs et al. on Mar. 23, 1999. First the surface that is to be replicated is scanned, optically or mechanically, to obtain location-dependent depth information, which is then converted into electrical control signals, which can be imparted to a laser. Then the laser head emitting a single beam is either moved across the surface that is to be engraved if a flat surface is to be used. If a roller is to be engraved, the roller surface is rotated beneath the laser head to permit embossing. In both cases, the head is indexed across the surface so that the depth contour information can be etched onto the entire surface of the work piece. The finished work piece is then used as an embossing tool to replicate this surface onto the desired product such as vinyl siding. Typically, the surface that is scanned is substantially smaller than the surface area of the work piece so that the scanned surface must be multiplied accordingly. In order to prevent boundary lines between various "information areas" from being visually identified, this disclosure requires overlapping scanning using depth contour information at abutting boundaries to achieve cross-fading of the pattern in the boundary line regions. Thus, it is stated that this mirroring of adjacent sections using overlapping laser control signals will result in the reduction of visible boundary lines.

Using this technique to obtain fine reproductions of surfaces normally requires making multiple passes across the work piece surface since the amount of material that can be removed on a single pass is limited to what can be removed by the beam. To do otherwise, would be akin to attempting to carve a statute out of marble block to obtain the finished art on a single pass. Obviously, larger amounts of material can initially be removed but as the desired surface is being reached, the amount of material that can be removed must be increasingly less on each subsequent pass.

While the advantages of using laser engraving techniques are substantial with prior art methods, surface depth contour information must first be obtained by scanning the surface, as disclosed in Hinrichs. Also, the requirement of multiple passes over the work piece substantially increases the production time to obtain a finished work piece that is finely engraved. There is also difficulty experienced during the process of engraving rollers due to the relative pitch movements that can occur between the laser engraving head and the rotating roller that is being engraved. This pitch or screw-like motion that occurs due to the laser head linear motion relative to the rotating roller during the engraving process may compromise the quality of the engraving by having detectable pitch lines showing as spiral seams on the work piece.

There is not found in the prior art a method and an apparatus that eliminates the problems identified above.

SUMMARY OF THE INVENTION

It is an aspect of the present invention to provide a laser engraving method that provides software control of a laser head to apportion the volume of material that is to be removed into laminated volumes with each laminated volume corresponding to a beam that is provided by a single laser head.

It is an aspect of the present invention to provide a laser engraving apparatus that utilizes a plurality of beams from a single laser head.

It is an aspect of the invention to provide a laser engraving method that improves the efficiency of the engraving process by reducing the cycle time and/or the energy consumption requirements.

Another aspect of the invention is to provide a laser engraving method that can be used to reproduce virtual patterns or scanned patterns.

Another aspect of the present invention to provide a laser engraving method that eliminates visible pitch lines on the engraved work piece.

Another aspect of the present invention is to provide laser engraving software that can divide each laminated volume of material that is to be removed into a plurality of elementary volumes such that the etched material that is removed is engraved in an array of shifted patches such that engraving boundaries/seams are not visible in the finished work piece.

Still another aspect of the invention is to provide a laser engraving method that during the engraving process for each patch, each laser beam works independently and sequentially on a shifted elementary volume of material.

Still another aspect of the invention is to provide a laser engraving method that is suitable to emboss silicon rubber rollers.

Another aspect of the invention is to provide a laser engraving method that is suitable to emboss fluorocarbon rollers.

Another aspect of the invention is to provide a laser engraving method that is suitable to emboss hydrogenated nitrile butadiene rubber coated rollers.

Finally, it is aspect of the invention is to provide a laser engraving method that, depending on the grain, can achieve an accurate engraved surface even with a single pass of the laser head across the surface that is being engraved.

These and other aspects of the invention will become apparent in light of the detailed description of the invention, which follows.

DESCRIPTION OF THE PREFERRED EMBODIMENTS

Figure 1:
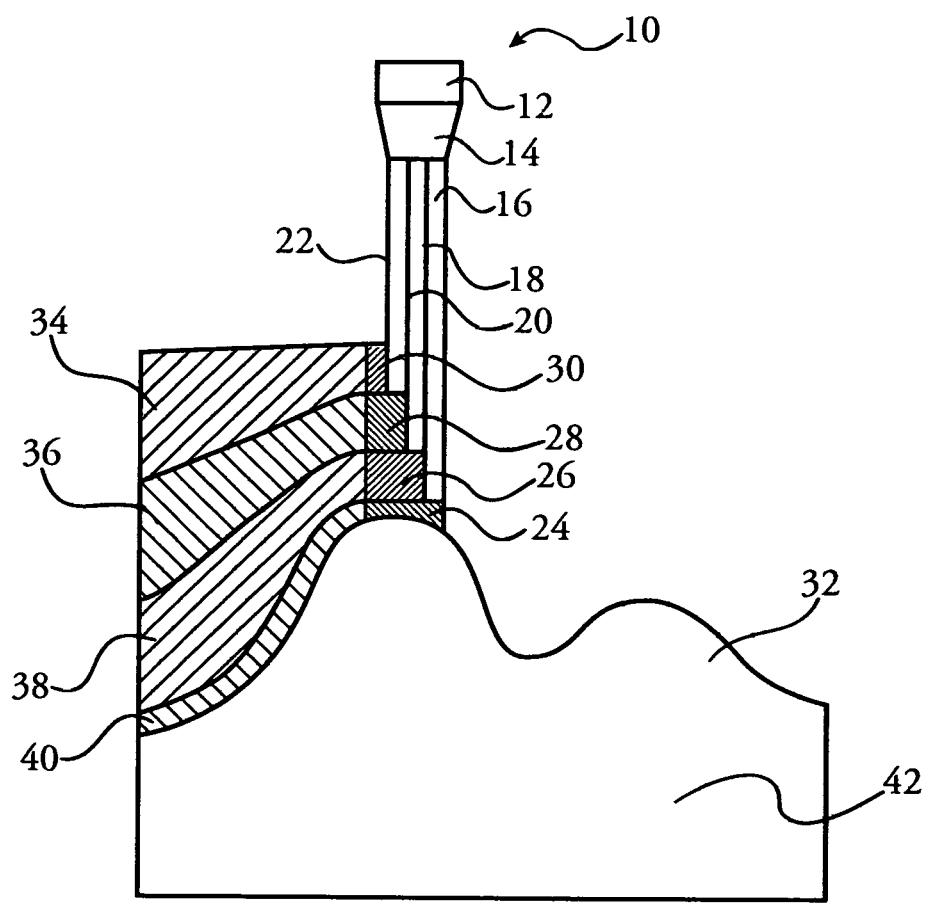
FIG. 1 is an illustration of the laser apparatus showing the head with four deflected and individually controlled beams in accordance with the invention.

As shown in FIG. 1, the laser engraving apparatus 10 is illustrated. Only the laser head 12 and work piece 42 with its desired surface configuration 32 is shown. The remaining part of the apparatus 10 has components well known in the art. While only an apparatus for engraving rollers is described, a device suitable for engraving flat surfaces would utilize the same specifications and could easily be constructed by those of ordinary skill in the art.

Laser head 12 is preferably a 220 Watt Fiber YAG laser with modulator and beam delivery optics. Apparatus 12 has a carriage (X-axis) incorporating mounting areas for the Z-axis assembly that serves to mount laser head assembly 12 including the beam deflection apparatus 14, which divides the beam into four individually controllable beams. An extraction port should be mounted adjacent to the laser head 12 to remove fumes and dust produced by the engraving process.

The Z-axis slideway that is mounted to the X-axis carriage is preferably machined to following specifications. The maximum traverse stroke should be approximately 150 mm. The maximum traverse speed should be approximately 500 mm/min. The positional accuracy should be approximately +/−0.003 mm and repeatability is preferably approximately 0.005 mm. The drive for the Z-axis assembly is a precision ball screw driven by a stepper motor. The stepper motor is de-energized during the engraving of a patch. The Z-axis is operated with encoder feedback and could be manually positioned for different roller diameters. Preferably, the Z-axis will be operated automatically by a controller.

The X-axis slideway is part of the mainframe of the invention and is precision machined. The maximum traverse stroke of the X-axis is preferably about 3,500 mm having a maximum traverse speed of approximately 2,000 mm/min. The positional resolution should be approximately +/−0.001 mm with a repeatability of 0.005 mm. The x-axis is driven by a precision thread screw provided by a servomotor with a gearbox and having rotary encoder feedback. Slideway bearings feature recirculating ball bearing units mounted on square section rails. To provide protection of the slideway, NEOPRENE bellows covers need to be provided.

The A-axis of the machine is used to drive the roller that is to be engraved. This section will be provided with a fixed rotary headstock mounted parallel to the X-Axis so that the roller can be rotated in front of the laser head. The maximum roller length that can be used is approximately 3,500 mm of which the maximum length that can be engraved is 3,400 mm. The maximum roller diameter is 400 mm and the minimum roller diameter is 150 mm. The maximum roller speed rotation speed (assuming a 150 mm roller) is 1000 rpm. The maximum roller weight is preferably about 800 kg. The A-axis would be driven via a multi-V belt drive gearbox by an AC servomotor with a shaft mounted rotary encoder. Finally, a tailstock will be provided having a live rotating center. The tailstock will be moveable linearly to adapt to various roller lengths.

Figure 3:
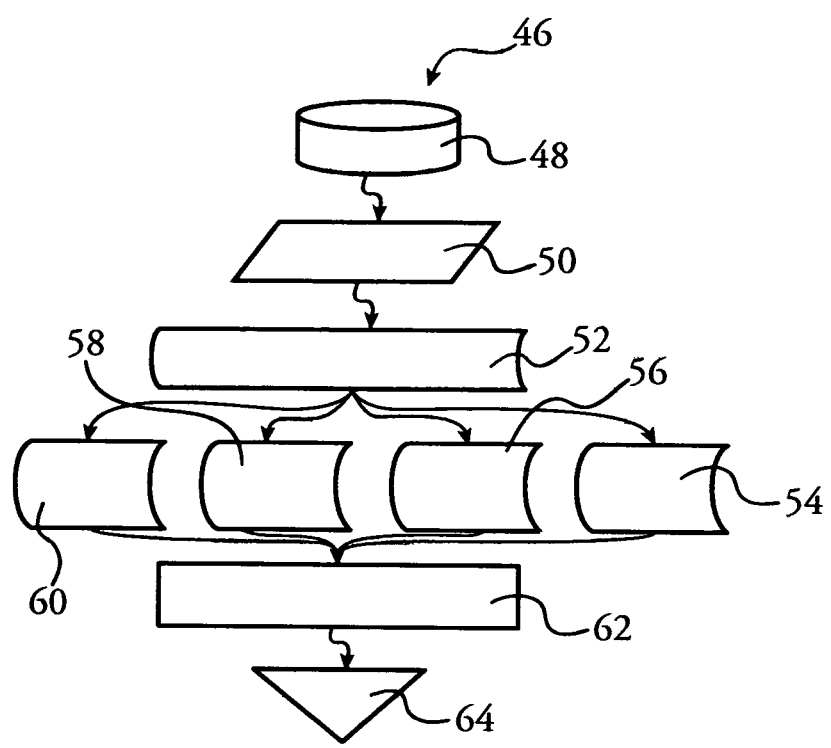
FIG. 3 is a flow chart depicting the logic steps that are used to control the laser beams in the apparatus.

An operator console is provided. The console features a PC controlled motion controller. As shown in FIG. 3, software 46 is provided that determines four laminated layers 54, 56, 58, 60 of material removal based on volume. Each laminated layer is further apportioned into elementary volumes of material, with each layered elementary volume corresponding to a particular beam. The software uses the input data to calculate the four lamination layers based on the maximum laser power available, the power gradients of the four beams, and the material characteristics. The input data file 48 is format specific to the laser engraving software. The contents of this file correspond to the volume information for all lamination layers. This file can be generated from any virtual or actual three-dimensional information. As the dataflow shows, the input data file 48 is used to provide a three dimensional representation 50 of the data file 48. Layer transformation 52 apportions the total volume to be removed into laminated layers 54, 56, 58, 60. Each laminated layer is then apportioned into elementary volumes by a laser interface preparation in laser interface 62 that is then used to control the beams in laser head 64. The internal three-dimensional representation 50 will be transformed to a volume model for the laminated layers. The apportioned elementary volumes at the laminated layers will then be stored in an internal cache and will be prepared for feeding the laser interface 62.

Operation

Referring again to FIG. 1, the operation of the method will be discussed. Laser head 12 through a modulator and beam-focusing device (e.g., an ACCUSTO optical modulator featured with beam focusing lens and nozzle assembly) will divide the beam into four deflected beams, 16, 18, 20 and 22. Each beam's spot size and intensity is powered in accordance with the elementary volume that is to be removed.

For each material to be engraved, according to the power modulator characteristics and the beam resolution, a reference set of optimized parameters for the laser beam power (f) and relevant beam size is defined to maximize an elementary and cylindrical reference volume (defined "V elem") of removable material. The three dimensional calculation of the total volume (34+36+38+40) of material to be removed is designated "Vo". The external surface of Vo is identified as "So".

The software optimizes the maximum laser head velocity (designated "Ve max"), which accomplishes the local "V elem" removal. Based on the reference set and on Ve max, the software apportions Vo in $V_1, V_2 \ldots V_n$ layers (34, 36, 38, 40), each of them surrounded by $S_1, S_2 \ldots S_n$ external surfaces. At each layer, based on the reference set of parameters tuned on "V elem", the software defines elementary volumes 24, 26, 28, 30 apportioned through the power gradient "grad f" function as follows:

$$\operatorname{grad} f = \lim_{V \to 0} \frac{1}{V} \oint_S f n \, dS$$

where "n", at each position, is the versor normal to an elementary layer surface.

As laser head 12 moves in direction 11 sequentially, beam 22 removes material in laminated layer 34; beam 20 removes material in laminated layer 36; beam 18 removes material in laminated layer 38; and beam 16 removes material in laminated layer 40. When laser head 12 is engraving in a single pass, layer 40 is the finishing layer, thus the desired surface can be embossed in accordance with the desired three-dimensional volume $V_4$ removal. Note that none of the beams individually engraves by referencing to a depth based on the total depth from the top of the surface of the raw material to the depth of the cut in the finished work piece 42 unlike the prior art.

Figure 2:
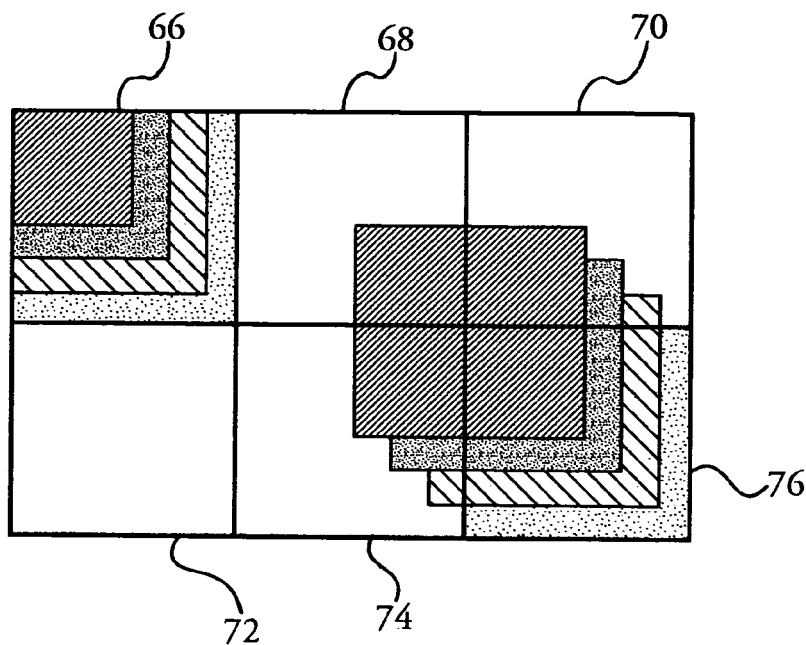
FIG. 2 is an illustration of the use of patches having elementary volumes of material removed using multiple beams from a single laser head in accordance with the invention.
Figure 2:
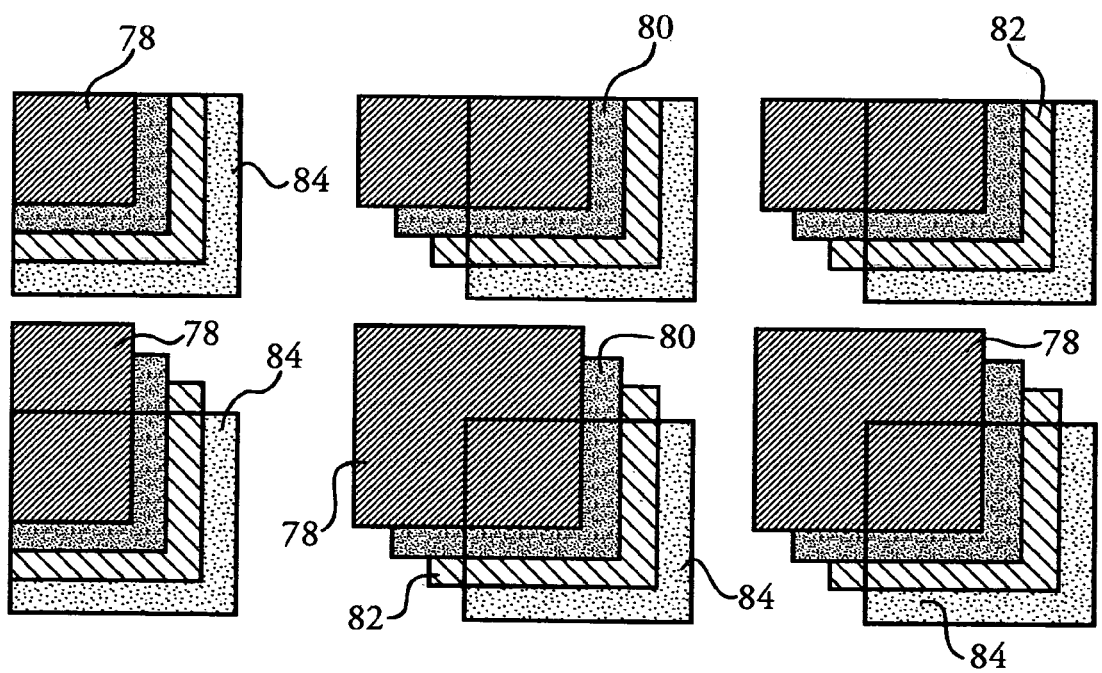

Referring to FIG. 2, the use of the four-beam approach also enables the roller or flat surface to be engraved by using a novel engraving technique. This method is a patch technique where the total engraved surface is divided into adjacent patches. The preferable size of the patch will depend primarily on the size of the roller, when engraving a roller, and on the kind of pattern. The smaller the diameter, the smaller the size of each patch. With flat surfaces, the size of the patch will depend on the physical characteristics of the laser head and the operational characteristics such as head speed, beam deflection, positional accuracy, repeatability, etc.

As shown in FIG. 2 a map of six representative patches 66, 68, 70, 72, 74, and 76 are provided in schematic form. While this method is principally for use with engraving rollers, it can also be used in engraving flat surfaces. It is also suitable for use with fluorocarbon or silicone rubber or hydrogenated nitrile butadiene rubber coated rollers as well as any material roller than is used for the continuous embossing of thermoplastic films. The method permits the engraving of rollers by seamless material removal to eliminate the visible "pitch" lines found using prior art methods. Pitch lines are spiral seams that occur due to the relative movements between the laser engraving head and the turning roller. These spirals seams degrade the quality of the three dimensional parts that are embossed using such rollers.

Each patch 66 is bordering one another and is shown in the schematic illustration as being flat and regular. However, the patches can be any three-dimensional shaped and irregular surface, depending on layers and elementary volumes apportionment discussed above. Each patch 66 has up to four progressively deepened layers 84, 82, 80, and 78, which are sequentially removed by each beam. Layer 84 corresponds to beam 22; layer 82 corresponds to beam 20; layer 80 corresponds to beam 18; and layer 78 corresponds to beam 16. As beam 22 removes the topmost layer; beam 20 removes the next progressively deeper layer; with beam 18 removing the next progressively deeper layer; and finally beam 16 provides the finishing material removal. Different layers at each patch are shifted by the deflection of the respective beams. The shifting can be variably adjusted depending on the beams' deflection setting and on the software apportionment and spatial allocation. The progressive engraving of the shifted patch's layers allows the elimination of bordering marks among adjacent patches. This happens because bordering marks among corresponding layers from adjacent patches are progressively and sequentially eliminated by shifted volumes removals at deeper layers of the same adjacent patches. As shown by the illustration of the six patches broken apart, area 78 represents the deepest (finished layer); area 84 represents the shallowest (topmost layer); area 80 represents the top middle layer, and area 82 represents the bottom-middle layer. After patch 66 is engraved, laser head 12 is indexed by the pre-calculated amount to permit engraving patch 68. Note that during the engraving of patch 68, the deflection of the beams 16, 18, 20, 22 are apportioned, overlapping onto patch 66 to eliminate any possible seam line where patch 66 and 68 abut one another. Patch 70 is next engraved, again with deflection of the beams 16, 18, 20, 22 being deflected apportionately to eliminate any visible seam and so on until all patches along that position of the A-axis of the roller is engraved. Then the A-axis is indexed to permit engraving the patches 72, 72 and 76 in the adjacent X-axis line can be engraved, again with each patch having the beams appropriately deflected to provide the overlapping to eliminate any seams.

Thus, once the patch is completed, the apparatus is indexed to the position of the next patch with the subsequent patch having elementary volumes shifted from the prior etched one. By combining the etching of the patches apportioned by the software, the total removal of material, because of the shifting of overlapped elementary volumes at layers from adjacent patches, do not show boundary marks.

Although the aforementioned disclosure pertains to roller engraving, the same novel patch method can also be used with flat surfaces. In this case, a single line of patches is engraved as noted above, then the Y-axis is indexed to permit engraving the next adjacent line and so on. Again, each patch is engraved having the beams deflected to overlap a previously engraved patch to remove any visible patch borderlines.

Referring to FIG. 3, the flow chart of the software control 46 is depicted. Input data file 48 contains the information specific to the volume information for all lamination layers. File 48 can be generated from any three dimensional information regarding a desired engraved surface. In file 50, a three dimensional representation of the engraved surface is prepared. File 52 then apportions the three-dimension representation of the engraved surface into laminated volumes, which is stored in file 52. Then, the respective layers 54, 56, 58 and 60 are separated and the respective elementary volumes are determined for each layer. The four distinct lamination layers and their respective elementary volumes are stored in an internal cache 26 which is then used to control file 46 which splits and deflects the four cutting beams. While the invention is shown using four beams, which is preferable, for the apparatus and methods presented herein, it should be apparent that more or less than four beams could be used depending on material removal factors regarding the laser, engraving material, cycle time, power gradients of the laser beam, complexity of the engraved surface, and degree of accuracy required.

While certain representative embodiments of the invention have been described herein for the purposes of illustration, it will be apparent to those skilled in the art that modification therein may be made without departure from the spirit and scope of the invention.

What is claimed is:

1. An apparatus for laser engraving a workpiece having distinct separately pre-defined laminated layers in the workpiece such that each of the laminated layers are stacked, one upon the other, providing a topmost laminated layer and a bottommost laminated layer as well as at least one intermediary laminated layer to provide a desired surface configuration, said apparatus comprising:

a laser head providing a controllable laser beam;

a power modulator and beam focusing apparatus associated with said laser head and dividing said laser beam into at least three separately controlled deflected, independent beams which sequentially engage the workpiece as the beams move over the workpiece, said power modulator controlling each beam to have a spot size and intensity corresponding to an elemental volume to be removed from only one of the distinct separately pre-defined laminated layers in the workpiece, wherein each of said at least three deflected beams focuses on and simultaneously engages only in its pre-defined laminated layer in the workpiece; and wherein each of at least three deflected beams is configured by the power modulator and beam forming apparatus to separately engage only its corresponding layer of the workpiece simultaneously in sequence as each beam moves over the workpiece, with the beam corresponding to the topmost layer of the workpiece first, followed by the beam corresponding to the immediately adjacent to the topmost laminated layer second and so on, until the beam corresponding to the bottommost layer being sequentially last so that said apparatus provides the desired surface configuration of said workpiece with a single pass of said laser head over the entire surface of said workpiece without visible pitch lines or boundary seams.

2. The apparatus of claim 1 wherein said workpiece is a surface of an engraving roller.

3. The apparatus of claim 2 wherein the surface of said engraving roller is made from silicon rubber.

4. The apparatus of claim 2 wherein the surface of said engraving roller is made from fluorocarbon.

5. The apparatus of claim 2 wherein the surface of said engraving roller is coated with hydrogenated nitrile butadiene rubber.

6. The apparatus of claim 1 wherein said workpiece is a planar surface.

7. The apparatus of claim 1 wherein the number of beams is preferably 4.

8. An apparatus comprising:

a workpiece having distinct separately pre-defined laminated layers in the workpiece such that each of the laminated layers are stacked, one upon the other, providing a topmost laminated layer and a bottommost laminated layer as well as at least one intermediary laminated layer to provide a desired surface configuration;

a laser head providing a controllable laser beam; and a power modulator and beam focusing apparatus associated with said laser head and dividing said laser beam into at least three separately controlled deflected, independent beams which sequentially engage the workpiece as the beams move over the workpiece, said power modulator controlling each beam to have a spot size and intensity configured to remove an elemental volume from only one of the distinct separately pre-defined laminated layers in the workpiece, wherein each of said at least three deflected beams focuses on and simultaneously engages only its the pre-defined laminated layer in the workpiece which it removes.

9. The apparatus of claim 8 wherein each of at least three deflected beams is configured by the power modulator and beam focusing apparatus to separately engage only its corresponding layer of the workpiece simultaneously in sequence as each beam moves over the workpiece, with the beam corresponding to the topmost laminated layer of the workpiece first as beam is moved over the workpiece, followed by the beam corresponding to the immediately adjacent to the topmost laminated layer second and so on, until the beam corresponding to the bottommost layer being sequentially last so that said apparatus provides the desired surface configuration of said workpiece with a single pass of said laser head over the entire surface of said workpiece without visible pitch lines or boundary seams.

\* \* \* \* \*